(12) United States Patent
Rabasco et al.

(10) Patent No.: US 9,971,899 B2
(45) Date of Patent: May 15, 2018

(54) SECURE, TARGETED, CUSTOMIZABLE DATA REMOVAL

(71) Applicant: International Business Machines Corporation, Armonk, NY (US)

(72) Inventors: Ralph A. Rabasco, LaGrange, NY (US); John P. Mullin, Poughkeepsie, NY (US); Neil A. Trapani, Highland, NY (US); Patrick J. Meaney, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 14/987,002

(22) Filed: Jan. 4, 2016

(65) Prior Publication Data

US 2017/0193232 A1   Jul. 6, 2017

(51) Int. Cl.
*G06F 21/60* (2013.01)
*G06F 3/06* (2006.01)

(52) U.S. Cl.
CPC ............ *G06F 21/60* (2013.01); *G06F 3/067* (2013.01); *G06F 3/0608* (2013.01); *G06F 3/0652* (2013.01); *G06F 3/0689* (2013.01)

(58) Field of Classification Search
CPC ...... G06F 21/60; G06F 3/0608; G06F 3/0652; G06F 3/0689; G06F 3/067
See application file for complete search history.

(56) References Cited

U.S. PATENT DOCUMENTS

| 7,668,883 | B2 * | 2/2010 | Tran ............. G06F 3/0623 707/662 |
| 7,707,371 | B1 | 4/2010 | Goheer et al. |
| 2007/0101055 | A1 | 5/2007 | Thorsen |

(Continued)

FOREIGN PATENT DOCUMENTS

EP   2631916A1 A1   8/2013

OTHER PUBLICATIONS

Wang, W. et al.; "An enhanced erasure code-based security mechanism for cloud storage"; Mathematical Problems in Engineering, vol. 2014, Article ID 293214, Nov. 16, 2014.

(Continued)

*Primary Examiner* — Reginald Bragdon
*Assistant Examiner* — Mehdi Namazi
(74) *Attorney, Agent, or Firm* — Nelson and Nelson; Daniel P. Nelson; Alexis V. Nelson

(57) ABSTRACT

A method for securely removing data from a storage system is disclosed. In one embodiment, such a method includes receiving, by a storage system, instructions to erase logical units from the storage system. In response to receiving the instructions, the storage system maps the logical units to physical extents on the storage system. The storage system then initiates, using at least one of hardware and software embedded in the storage system, a secure data removal process that securely erases data from the physical extents by overwriting the data thereon, while leaving intact data stored on other physical extents of the storage system. The storage system is configured to process I/O to the other (Continued)

physical extents during execution of the secure data removal process. A corresponding system and computer program product are also disclosed.

20 Claims, 7 Drawing Sheets

(56) References Cited

U.S. PATENT DOCUMENTS

| | | | |
|---|---|---|---|
| 2008/0104359 A1* | 5/2008 | Sauer | G06F 3/0608 |
| | | | 711/202 |
| 2011/0055588 A1 | 3/2011 | DeHaan | |
| 2012/0093318 A1 | 4/2012 | Obukhov et al. | |
| 2012/0239943 A1 | 9/2012 | Okamoto | |
| 2013/0173744 A1* | 7/2013 | Xinglong | G06F 3/0617 |
| | | | 709/217 |
| 2013/0268740 A1 | 10/2013 | Holt | |
| 2014/0143475 A1* | 5/2014 | Kasorla | G11C 16/10 |
| | | | 711/103 |
| 2014/0157279 A1* | 6/2014 | Horikawa | G06F 9/52 |
| | | | 718/102 |
| 2014/0201478 A1 | 7/2014 | Gunda et al. | |
| 2015/0106562 A1 | 4/2015 | Helmer et al. | |
| 2015/0186488 A1* | 7/2015 | Fischer | G06F 11/1471 |
| | | | 707/615 |
| 2016/0364155 A1* | 12/2016 | Fitzpatrick | G11C 16/10 |

OTHER PUBLICATIONS

Anonymously; "Method and System for an Optimized Secure Erase of Data on Non-Volatile Data Storage Devices"; An IP.com Prior Art Database Technical Disclosure; http://ip.com/IPCOM/000205100; Mar. 15, 2011.

IBM; "Automated Secure-Erase Feature for Storage Enclosure"; An IP.com Prior Art Database Technical Disclosure; http://ip.com/IPCOM/000183041; May 12, 2009.

* cited by examiner

SECURE, TARGETED, CUSTOMIZABLE DATA REMOVAL

BACKGROUND

Field of the Invention

This invention relates to systems and methods for securely removing data from storage systems.

Background of the Invention

Data erasure (also referred to as data clearing or data wiping) refers to techniques for destroying data on digital media such as hard disk drives, solid state drives, tape, or the like, in a way that renders the data permanently unrecoverable. Such techniques are typically much more comprehensive than conventional file deletion techniques, which often only remove direct pointers or references to data as opposed to destroying the data itself. In many cases, data that has been "deleted" using conventional file deletion techniques may be recovered using various software tools. Unlike degaussing and physical destruction which render digital storage media completely unusable, data erasure techniques typically destroy data in a way that allows the underlying storage media to be repurposed and reused, thereby preserving physical storage assets.

Although various different data erasure algorithms may be used, the data erasure technique developed and promulgated by the U.S. Department of Defense (DoD) is recognized as the industry-wide standard for secure data removal from storage subsystems. The DoD technique is very specific in regard to how data erasure is performed. The DoD data erasure technique uses a sequential process that requires up to eight passes per physical disk drive using random data patterns to overwrite existing data. During each pass, the random pattern is changed and the updated pattern is written over the entire physical disk surface. Unfortunately, the DoD data erasure technique is very slow and substantially impairs I/O performance of storage resources while in process. In many cases, storage resources are taken offline during the DoD erasure process, making them completely inaccessible. In environments containing many storage resources or large amounts of storage, successfully executing the DoD data erasure technique can have a severe impact on operations for days or even weeks.

In view of the foregoing, what are needed are systems and methods to more efficiently execute data erasure processes than those used today, such as the DoD data erasure technique described above. Ideally, such systems and methods will reduce the amount of time required to execute such processes. Further needed are systems and methods to more specifically target data for erasure while processing I/O transactions involving data that is not being erased.

SUMMARY

The invention has been developed in response to the present state of the art and, in particular, in response to the problems and needs in the art that have not yet been fully solved by currently available systems and methods. Accordingly, the invention has been developed to provide systems and methods to securely remove data from storage systems. The features and advantages of the invention will become more fully apparent from the following description and appended claims, or may be learned by practice of the invention as set forth hereinafter.

Consistent with the foregoing, a method for securely removing data from a storage system is disclosed herein. In one embodiment, such a method includes receiving, by a storage system, instructions to erase logical units from the storage system. In response to receiving the instructions, the storage system maps the logical units to physical extents on the storage system. The storage system then initiates, using at least one of hardware and software embedded in the storage system, a secure data removal process that securely erases data from the physical extents by overwriting the data thereon, while leaving intact data stored on other physical extents of the storage system. The storage system is configured to process I/O to the other physical extents during execution of the secure data removal process.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
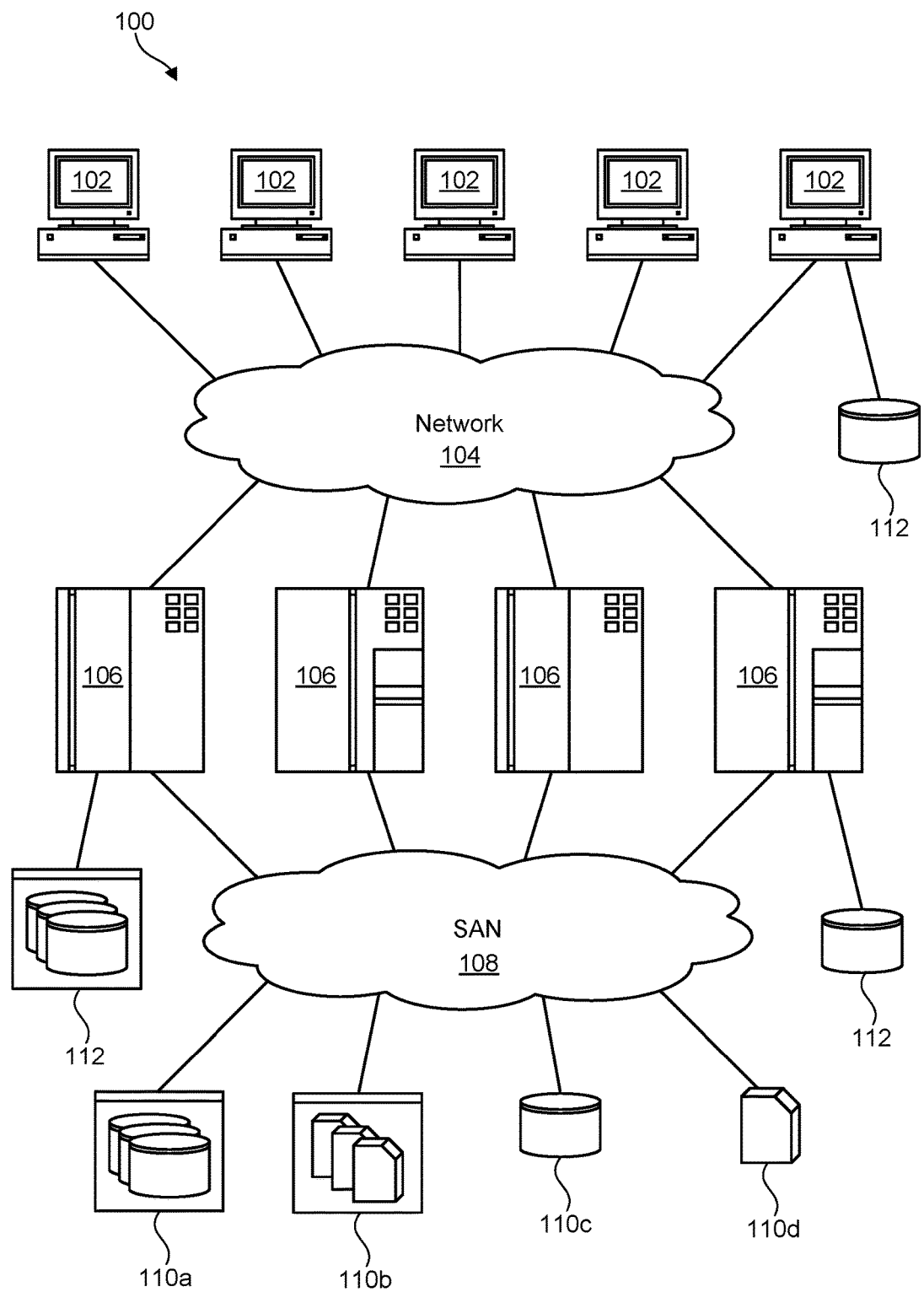
FIG. 1 is a high-level block diagram showing one example of a network environment in which a system and method in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented only by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host servers" 106). In general, the client computers 102 initiate communication sessions, whereas the host servers 106 wait for requests from the client computers 102. In an embodiment, the host servers 106 may consist of one or more mainframe servers, open systems, or the like. In an embodiment, the host server 106 may run an operating system, such as MVS, z/OS, linux, or the like. In certain embodiments, the client computers 102 and/or host servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the host servers 106, such as a storage-area-network (SAN) 108. The storage-area-network 108 can also be implemented as a local-area-network (LAN) (e.g., when using network-attached storage). This SAN 108 may connect the host servers 106 to one or more storage systems 110, such as arrays 110*a* of hard-disk drives or solid-state drives, tape libraries 110*b*, individual hard-disk drives 110*c* or solid-state drives 110*c*, tape drives 110*d*, CD-ROM libraries, or the like. To access a storage system 110, a host server 106 may communicate over physical connections from one or more ports on the host server 106 to one or more ports on the storage system 110. A connection may be through a switch, fabric, direct connection, or the like. In certain embodiments, the host servers 106 and storage systems 110 may communicate using a networking standard such as Fibre Channel (FC).

Figure 2:
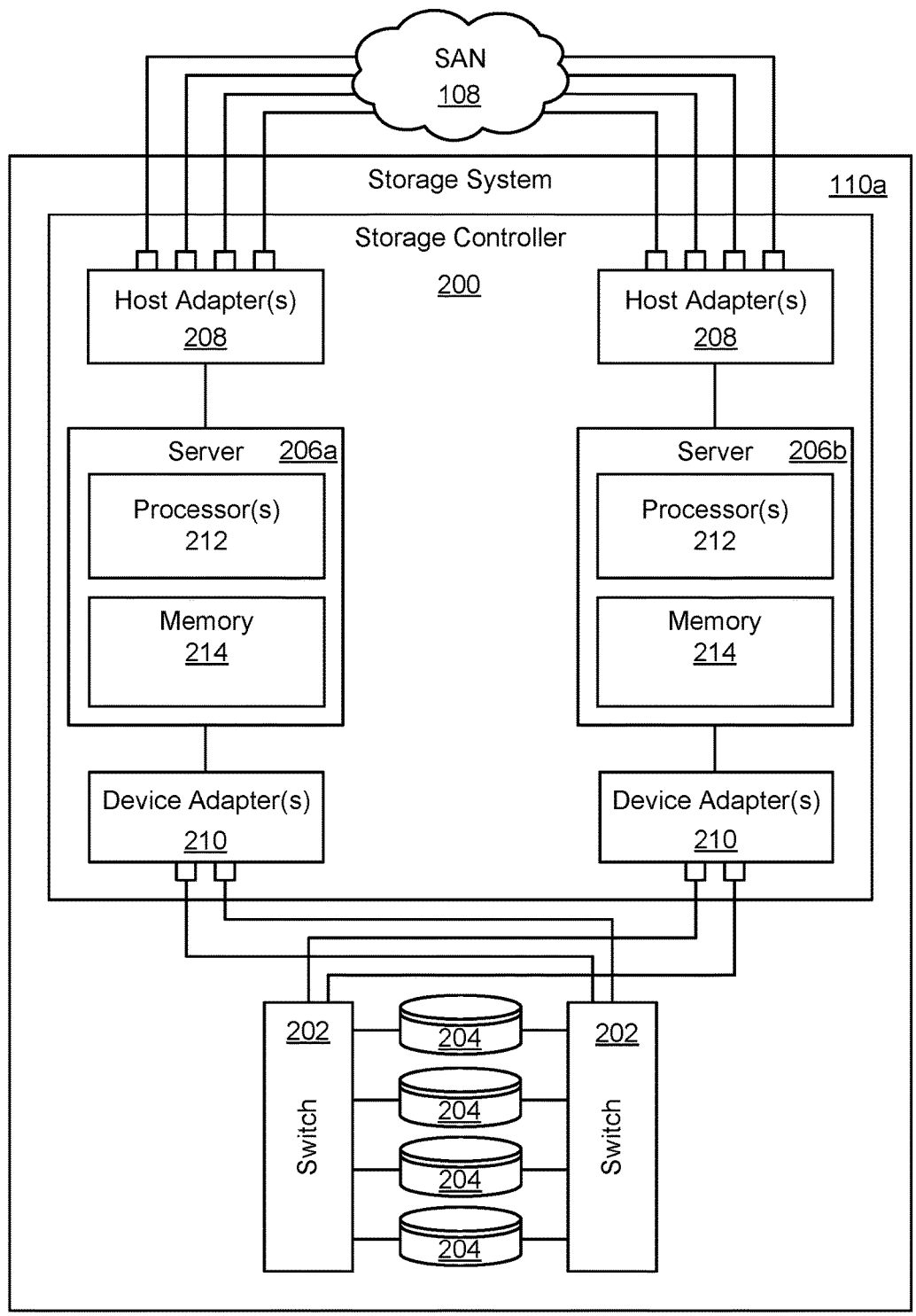
FIG. 2 is a high-level block diagram showing one embodiment of a storage system in which a system and method in accordance with the invention may operate.

Referring to FIG. 2, one embodiment of a storage system 110*a* containing an array of hard-disk drives 204 and/or solid-state drives 204 is illustrated. As shown, the storage system 110*a* includes a storage controller 200, one or more switches 202, and one or more storage drives 204, such as hard disk drives 204 or solid-state drives 204 (such as flash-memory-based drives 204). The storage controller 200 may enable one or more host servers 106 to access data in the one or more storage drives 204.

In selected embodiments, the storage controller 200 includes one or more storage servers 206. The storage controller 200 may also include host adapters 208 and device adapters 210 to connect the storage controller 200 to host servers 106 and storage drives 204, respectively. Multiple storage servers 206*a*, 206*b* may provide redundancy to ensure that data is always available to connected host servers 106. Thus, when one storage server 206*a* fails, the other storage server 206*b* may pick up the I/O load of the failed storage server 206*a* to ensure that I/O is able to continue between the host servers 106 and the storage drives 204. This process may be referred to as a "failover."

In selected embodiments, each storage server 206 may include one or more processors 212 and memory 214. The memory 214 may include volatile memory (e.g., SRAM or DRAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The storage servers 206 may host at least one instance of these software modules. These software modules may manage all read and write requests to logical volumes in the storage drives 204.

One example of a storage system 110*a* having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110*a*, but may operate with any comparable or analogous storage system 110, regardless of the manufacturer, product name, or components or component names associated with the storage system 110. Furthermore, any storage system 110 that could benefit from one or more embodiments of the invention is deemed to fall within the scope of the invention. Thus, the IBM DS8000™ is presented only by way of example and is not intended to be limiting.

Figure 3:
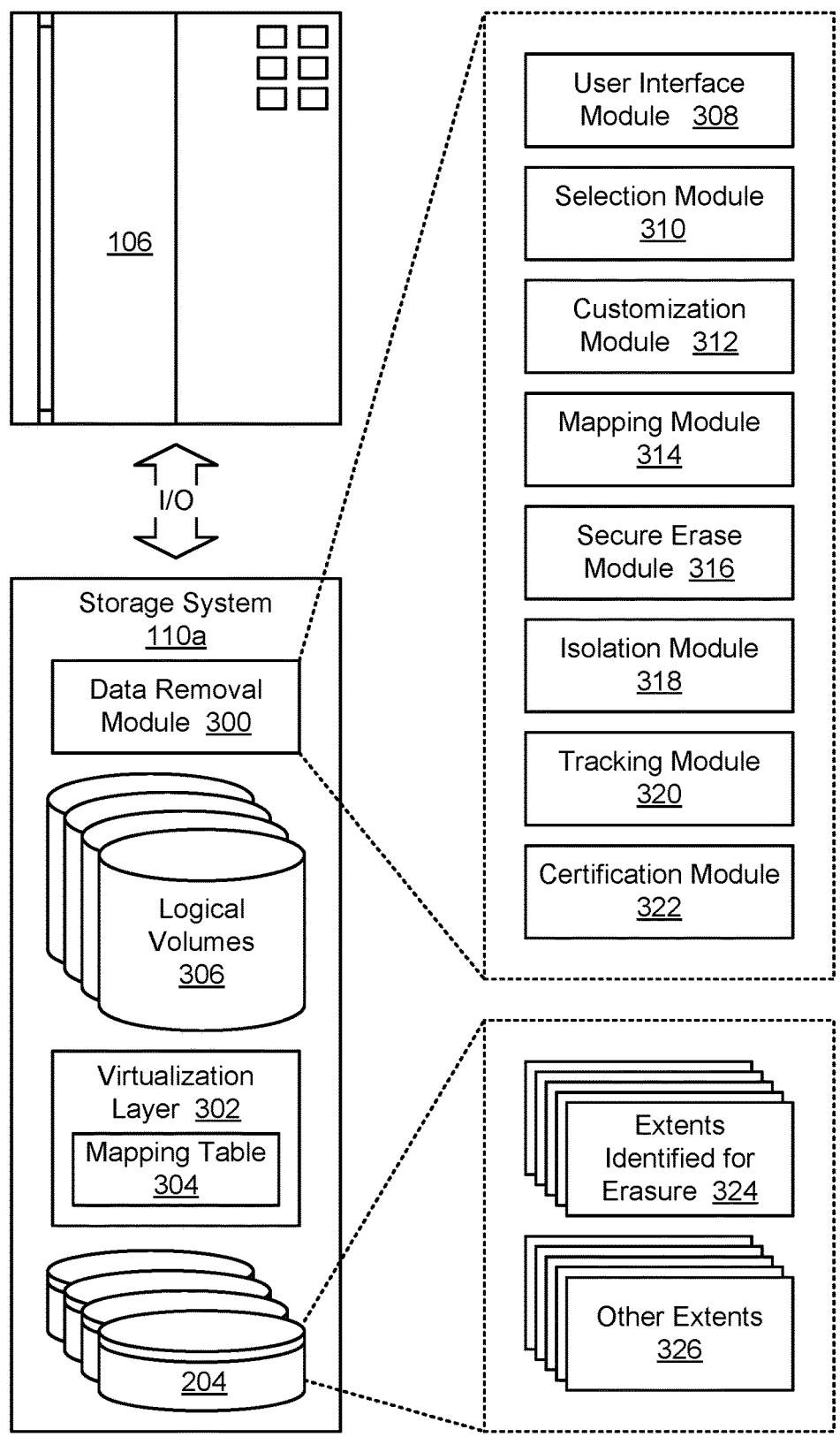
FIG. 3 is a high-level block diagram showing various modules that may be used to securely remove data from a storage system.

Referring to FIG. 3, in certain embodiments, a storage system 110*a* such as that illustrated in FIG. 2 may be configured with a data removal module 300 to securely remove data from the storage system 110*a*. The data removal module 300 may be implemented in hardware, software, firmware, or a combination thereof. In certain embodiments, the data removal module 300 is embodied as a dedicated chip or hardware module embedded in the storage controller 200 of the storage system 110*a*. The data removal module 300 may be configured to implement a secure data erasure process, such as the DoD data erasure process previously discussed, on logical volumes 306 of the storage system 110*a*. As shown, the data removal module 300 is implemented mostly or entirely within the storage system 110*a*. This allows the storage system 110*a* to execute the data removal process with little or no host server 106 involvement. This reduces overhead and stress on a host server 106, and eliminates or reduces time that a host server 106 may be unavailable during a data removal process.

As shown, the data removal module 300 may include various sub-modules to provide various features and functions. These sub-modules may include one or more of a user interface module 308, selection module 310, customization module 312, mapping module 314, secure erase module 316, isolation module 318, tracking module 320, and certification module 322.

The interface module 308 may provide an interface for a user or administrator to interact with the data removal module 300. Because the data removal module 300 may execute a secure data erasure process that completely destroys data, the data removal module 300 may in certain embodiments only be invoked or configured by a system administrator or user with adequate training and/or authority. Thus, in certain embodiments, the interface module 308 provides a secure login or other authentication mechanism to ensure that a user is authorized to invoke and/or configure the data removal module 300. The interface module 308 may enable interaction between a user and the data removal module 300 using any suitable mechanism, such as a graphical user interface (GUI), command line interface (CLI), or the like.

The selection module 310 may enable a user or administrator to select logical units (e.g., logical volumes, etc.) on which to execute the secure data removal process. As shown in FIG. 3, in certain embodiments, a virtualization layer 302 within the storage system 110*a* may present one or more logical volumes 306 to external systems such as the host server 106. These logical volumes 306 may map to one or more physical storage drives 204, such as hard disk drives, solid state drives, or the like. The physical storage drives 204 may be stand-alone drives or organized into redundant arrays of independent disks (RAIDS). A logical volume 306 may map to a single physical storage drive 204, or span all or part of multiple physical storage drives 204. Similarly, a storage drive 204 may host a single logical volume 306 or all or part of multiple logical volumes 306. External systems may be unaware of the underlying physical storage configuration making up the logical volumes 306. A mapping table 304 within the virtualization layer 302 may be used to map logical volumes 306 to physical storage drives 204, and vice versa.

The customization module 312 may be configured to customize a secure data removal process. For example, the customization module 312 may customize the secure data removal process for cloud or standard enterprise storage configurations. The manner in which the secure data removal process is executed may differ significantly based on the underlying storage configuration. In other embodiments, the customization module 312 may enable data removal procedures to be scheduled at specific times, or in response to specified conditions. For example, data removal procedures may be scheduled to occur during off-peak hours so as not to overburden the storage controller 200 or impact performance during periods of significant I/O.

Once one or more logical units have been selected with the selection module 310, the mapping module 314 may map the logical units to storage elements (e.g., tracks, extents 324, etc.) on the underlying storage drives 204. The mapping module 314 may utilize the mapping table 304 to perform this task. The secure erase module 316 may then execute a secure data removal process (e.g., the DoD data erasure process, etc.) on the underlying storage media 204. As previously explained, the DoD data erasure process uses a sequential process that requires up to eight passes per physical disk drive using random data patterns to overwrite existing data. During each pass, the random pattern is changed and the updated pattern is written over the entire physical disk surface. Unfortunately, the DoD data erasure process is typically very slow. For this reason, the secure erase module 316 may, in certain embodiments, be configured for multi-threaded operation to erase data from storage drives 204 in parallel. That is, the secure erase module 316 may be configured to execute multiple threads simultaneously to more expeditiously erase data from the storage drives 204. Although different threads may simultaneously perform a secure data removal process on different storage areas, the secure erase module 316 may, in certain embodiments, be configured to ensure that the same thread executes all passes of the secure data removal process on its respective storage area. This will ensure that passes of the secure data removal process are performed in order, which may be important to ensure that data is fully erased.

When securely erasing data, the secure erase module 316 may, in certain embodiments, ensure that intermediate storage areas (e.g., cache, memory, etc.) in the storage system 110a have been purged of data associated with extents 324 identified for erasure. In certain embodiments, particularly in embodiments where the intermediate storage areas are non-volatile, the intermediate storage areas, or portions of the intermediate storage areas storing data targeted for erasure, may be subjected to the same secure data removal process as the storage drives 204. This will ensure that residual copies of data do not persist in intermediate storage areas after execution of the secure data removal process. In certain embodiments, the secure erase module 316 may also freeze a virtual/physical mapping (e.g., freeze the mapping table 304) between logical units and physical extents during the secure data removal process, thereby preventing changes to the mapping that could potentially enable certain data to be erased unintentionally, or other data to undesirably survive the erasure process.

The isolation module 318 may be configured to isolate extents 324 (or other storage elements) targeted for erasure from extents 326 not targeted for erasure to enable I/O to continue to the extents 326 during the secure data removal process. For example, the isolation module 318 may enable I/O to continue to some logical volumes 306 on the storage system 110a while other logical volumes 306 are being securely erased. The end effect is that I/O may continue to some storage drives 204 on the storage system 110a while other storage drives 204 are being securely erased. Similarly, I/O may continue to some extents 326 of a storage drive 204 while other extents 324 of the same storage drive 204 are being securely erased. This differs significantly from conventional data erasure processes, which typically take an entire storage system 110a offline during the data erasure process, as well as erase all data on the storage system 110a. In short, the isolation module 318 may minimize or reduce impacts on extents 326 or other storage elements not identified for erasure during the data removal process.

The tracking module 320 may be configured to track progress of the data removal process. If the data removal process is interrupted by a power outage or other event, the tracking module 320 may be used to resume the data removal process at the point where the process was halted. In certain embodiments, the tracking module 320 periodically stores progress of the data removal process in non-volatile storage of the storage system 110a so that progress of the data removal process may be determined after power is restored. This prevents having to repeat or duplicate erasures already performed.

Once the data removal process is complete, the certification module 322 generates a certificate of completion. This certificate proves that the data removal process completed. In an embodiment, the certificate lists storage elements (e.g., extents, tracks, etc.) that were successfully erased. In other or the same embodiments, the certificate may provide a block map that provides starting/ending points of the data removal process on the storage media, as well as logical delete checksum values that verify that the data stored thereon was actually erased. The certificate may also list storage elements or areas that were not successfully erased. Certificates generated by the certification module 322 may, in certain embodiments, be stored on the storage system 110a until retrieved by a user or administrator. These certificates may in certain embodiments be provided in the form of a document that can be printed, saved, transmitted, or the like.

Figure 4:
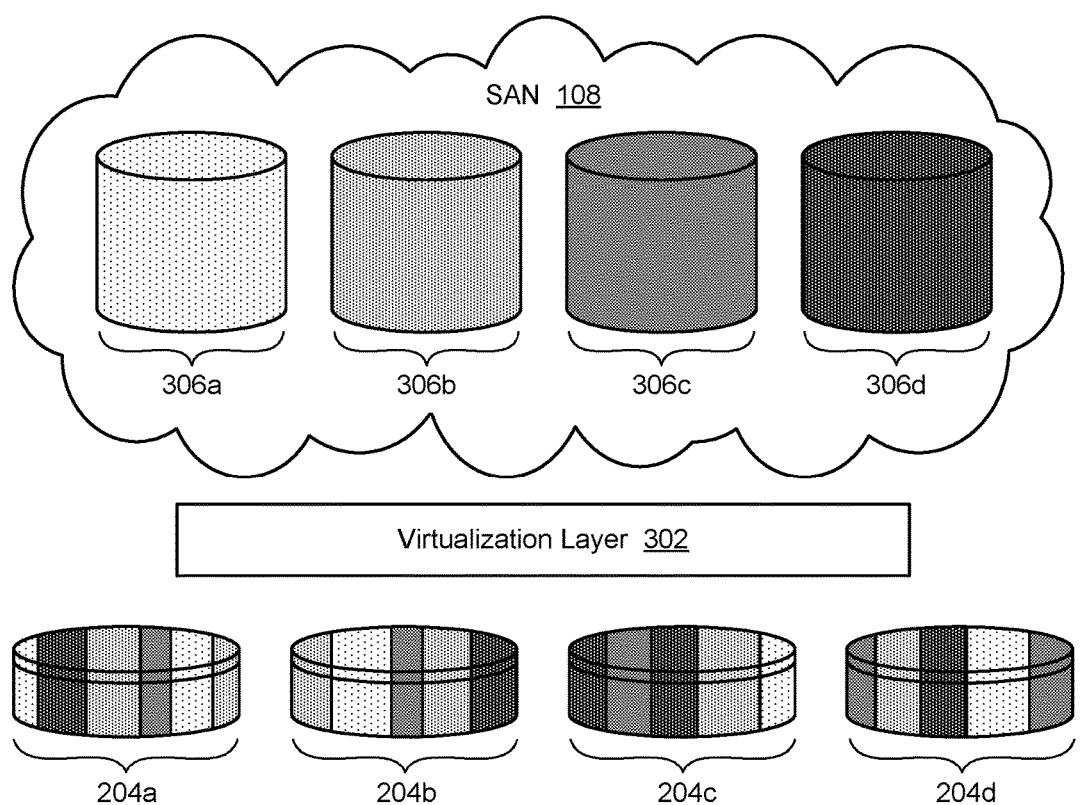
FIG. 4 shows one example of a relationship between logical volumes and underlying physical storage drives within a storage system.
Figure 5:
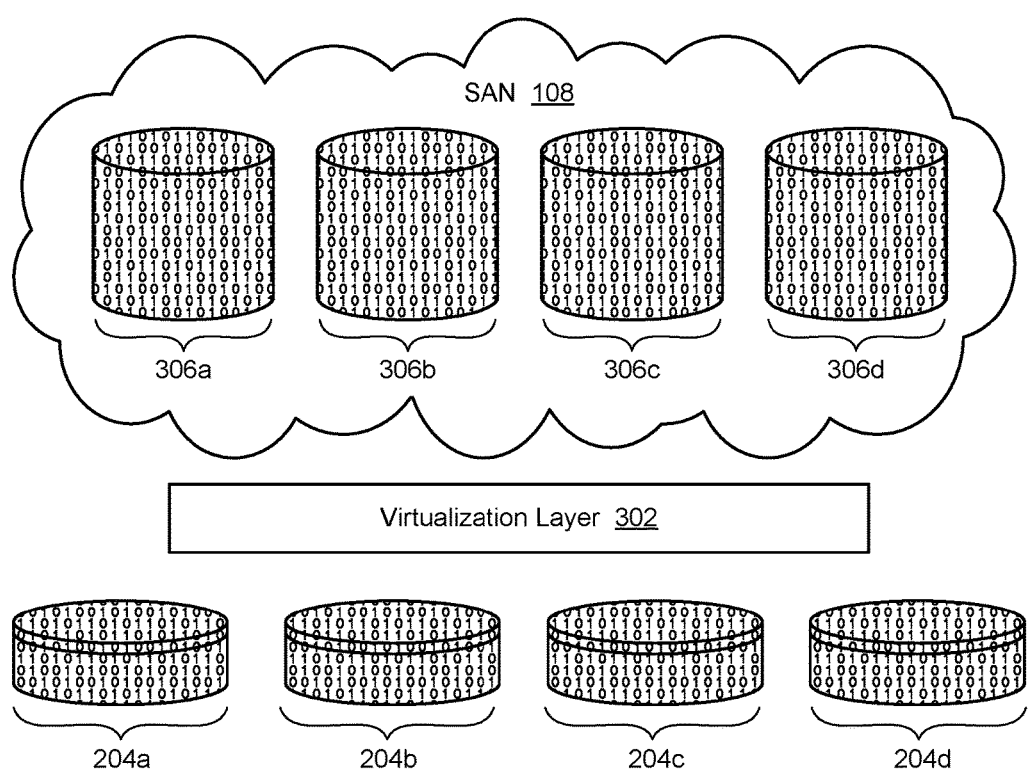
FIG. 5 shows a conventional data removal process to erase data on the logical volumes of FIG. 4.
Figure 6:
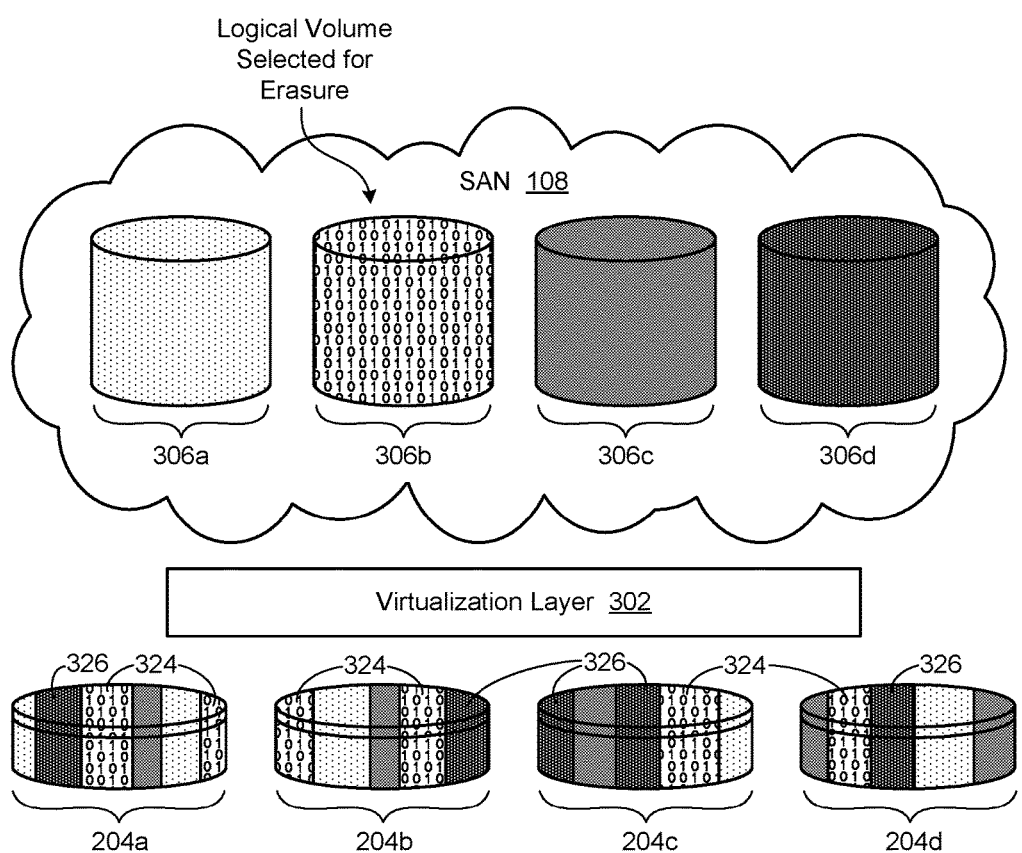
FIG. 6 shows an improved data removal process to erase data on the logical volumes of FIG. 4.

Referring to FIGS. 4 through 6, advantages of the improved data removal process disclosed herein are illustrated. FIG. 4 shows one example of a group of logical volumes 306a-d presented to external systems by a virtualization layer 302 of a storage system 110a. These logical volumes 306a-d may be implemented on a set of physical storage drives 204a-d. As shown by the shading of the logical volumes 306a-d and storage drives 204a-d, the storage space of the logical volumes 306 may, in certain embodiments, be distributed across multiple storage drives 204a-d. Similarly, the storage drives 204a-d may include storage space dedicated to different logical volumes 306a-d.

Referring to FIG. 5, in conventional data removal processes, a storage system 110a may be taken offline and all logical volumes 306a-d on the storage system 110a may be erased. Such conventional data removal processes typically erase all data on underlying storage drives 204a-d, including the logical configuration of the storage drives 204. During such processes, which may take on the order of days or weeks, the storage system 110a and associated storage drives 204a-d may be unavailable for use.

Referring to FIG. 6, an improved data removal process in accordance with the invention is illustrated. As shown, the improved data removal process enables certain logical volumes 306 to be selected and isolated within the storage system 110a. A secure data removal process may then be executed on the logical volumes 306 to remove data contained on their physical extents 324 while leaving intact data stored on other physical extents 326 of the storage system 110a. The improved data removal process may preserve the logical configuration of the storage drives 204.

During the data removal process, I/O may continue to extents not targeted for erasure. For example, assume that the logical volume 306b shown in FIG. 6 is selected for erasure while logical volume 306d is left intact. The data removal module 300 may map the logical volume 306b to extents 324 on the underlying storage drives 204a-d and execute the data removal process thereon, while leaving intact data on extents 326 associated with the logical volume 306d. In certain cases, this may result in certain storage drives 204, or certain portions of the storage drives 204 being erased, while other storage drives 204 or portions of the storage drives 204 are left in their current state. During the secure data removal process, I/O to extents 326 not being erased may continue to be processed.

Figure 7:
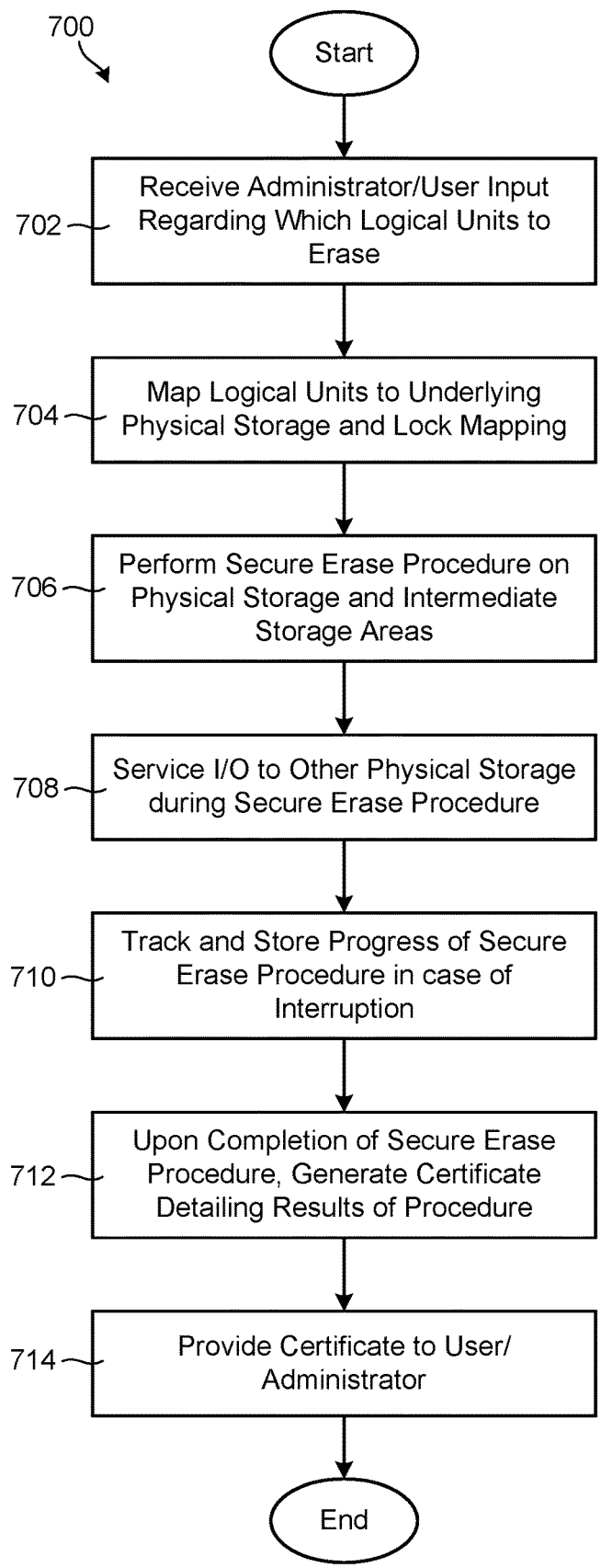
FIG. 7 shows one embodiment of a method for securely removing data from a storage system.

Referring to FIG. 7, one embodiment of a method 700 for securely removing data from a storage system 110a is illustrated. As shown, the method 700 initially receives 702 administrator/user input regarding which logical units to erase from the storage system 110a. The method 700 then maps 704 the selected logical units to underlying physical storage drives 204 and/or portions (e.g., extents) of the storage drives 204, and locks 704 the mapping to prevent changes thereto while the secure data removal process is in progress.

The method 700 then performs 706 a secure data removal process to erase data on the storage drives 204 and/or portions of the storage drives 204. The method 700 may also perform 706 the secure data removal process on any intermediate storage areas (e.g., cache, memory, etc.) of the storage system 110a to ensure that any residual copies of the data are erased. During this secure data removal process, I/O continues 708 to other physical storage or portions of physical storage not being erased by the data removal process. The method 700 also tracks 710 and stores 710 the progress of the secure data removal process in case the process is interrupted by a power outage or other event. Upon completion of the secure data removal process, the method 700 generates 712 a certificate that details the results of the data removal process, such as the time of completion and the actual storage elements (e.g., extents, tracks, etc.) or areas that were erased. This certificate may be provided 714 to a user or administrator as proof that the logical units selected for erasure were actually erased.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur in an order other than that noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for securely removing data from a storage system, the method comprising:
   receiving, by a storage system, instructions to erase logical units from the storage system;
   mapping, by the storage system, the logical units to physical extents on the storage system;
   initiating, by the storage system using at least one of hardware and software embedded within the storage system, a secure data removal process that securely erases data from the physical extents by overwriting the data thereon, while leaving intact data stored on other physical extents of the storage system; and
   purging, as part of the secure data removal process, intermediate storage areas of the storage system that store data associated with the logical units.

2. The method of claim 1, wherein erasing the data from the physical extents comprises securely erasing the data from the physical extents using multiple threads that operate in parallel.

3. The method of claim 2, further comprising ensuring that each thread of the multiple threads performs all passes of the secure data removal process on a respective extent.

4. The method of claim 1, wherein the secure data removal process is a Department of Defense secure data removal process.

5. The method of claim 1, further comprising freezing a mapping between the logical units and physical extents during execution of the secure data removal process.

6. The method of claim 1, further comprising processing, by the storage system, I/O to the other physical extents during execution of the secure data removal process.

7. The method of claim 1, wherein the intermediate storage areas include non-volatile cache.

8. A computer program product for securely removing data from a storage system, the computer program product comprising a computer-readable storage medium having computer-usable program code stored therein, the computer-usable program code comprising:
   computer-usable program code to enable a storage system to receive instructions to erase logical units from the storage system;
   computer-usable program code to enable the storage system to map the logical units to physical extents on the storage system;
   computer-usable program code to enable the storage system to initiate a secure data removal process that securely erases data from the physical extents by overwriting the data thereon, while leaving intact data stored on other physical extents of the storage system; and
   computer-usable program code to purge, as part of the secure data removal process, intermediate storage areas of the storage system that store data associated with the logical units.

9. The computer program product of claim 8, wherein securely erasing the data from the physical extents comprises securely erasing the data from the physical extents using multiple threads that operate in parallel.

10. The computer program product of claim 9, further comprising ensuring that each thread of the multiple threads performs all passes of the secure data removal process on a respective extent.

11. The computer program product of claim 8, wherein the secure data removal process is a Department of Defense secure data removal process.

12. The computer program product of claim 8, further comprising computer-usable program code to freeze a mapping between the logical units and physical extents during execution of the secure data removal process.

13. The computer program product of claim 8, further comprising computer-usable program code to enable the storage system to process I/O to the other physical extents during execution of the secure data removal process.

14. The computer program product of claim 8, wherein the intermediate storage areas include non-volatile cache.

15. A system for securely removing data from a storage system, the system comprising:

at least one processor;

at least one memory device operably coupled to the at least one processor and storing instructions for execution on the at least one processor, the instructions causing the at least one processor to:

enable a storage system to receive instructions to erase logical units from the storage system;

enable the storage system to map the logical units to physical extents on the storage system;

enable the storage system to initiate a secure data removal process that securely erases data from the physical extents by overwriting the data thereon, while leaving intact data stored on other physical extents of the storage system; and purge, as part of the secure data removal process, intermediate storage areas of the storage system that store data associated with the logical units.

16. The system of claim 15, wherein securely erasing the data from the physical extents comprises securely erasing the data from the physical extents using multiple threads that operate in parallel.

17. The system of claim 15, wherein each thread of the multiple threads performs all passes of the secure data removal process on a respective extent.

18. The system of claim 15, wherein the secure data removal process is a Department of Defense secure data removal process.

19. The system of claim 15, wherein the instructions further cause the at least one processor to freeze a mapping between the logical units and physical extents during execution of the secure data removal process.

20. The system of claim 15, wherein the instructions further cause the at least one processor to enable the storage system to process I/O to the other physical extents during execution of the secure data removal process.

* * * * *